(12) United States Patent
Ma et al.

(10) Patent No.: US 11,431,244 B2
(45) Date of Patent: Aug. 30, 2022

(54) POWER MANAGEMENT CIRCUIT, CAPACITOR MANAGEMENT CIRCUIT AND CAPACITOR MANAGEMENT METHOD THEREOF

(71) Applicant: Silergy Semiconductor Technology (Hangzhou) LTD, Hangzhou (CN)

(72) Inventors: Yunliang Ma, Hangzhou (CN); Lingdong Zhang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 115 days.

(21) Appl. No.: 16/984,330

(22) Filed: Aug. 4, 2020

(65) Prior Publication Data
US 2021/0050776 A1  Feb. 18, 2021

(30) Foreign Application Priority Data
Aug. 15, 2019  (CN) .......................... 201910753547.1

(51) Int. Cl.
*H02M 3/07* (2006.01)
*H02J 7/00* (2006.01)
*H02J 7/34* (2006.01)
*H02J 9/06* (2006.01)

(52) U.S. Cl.
CPC ............. *H02M 3/07* (2013.01); *H02J 7/0068* (2013.01); *H02J 7/345* (2013.01); *H02J 9/061* (2013.01)

(58) Field of Classification Search
CPC .......... H02J 9/061; H02J 7/0068; H02J 7/345; H02M 3/07; H02M 3/18
See application file for complete search history.

(56) References Cited

U.S. PATENT DOCUMENTS

| | | | |
|---|---|---|---|
| 7,696,735 B2 | 4/2010 | Oraw et al. | |
| 7,907,429 B2 | 3/2011 | Ramadass et al. | |
| 8,098,056 B2* | 1/2012 | Yamazaki | H02M 3/158 323/222 |
| 9,680,303 B2 | 6/2017 | Takahashi et al. | |
| 10,615,696 B2* | 4/2020 | Jung | G05F 1/577 |

* cited by examiner

*Primary Examiner* — Nguyen Tran

(57) ABSTRACT

A capacitor management circuit for a power management circuit, where the power management circuit includes a bidirectional converter having first and second ports, the capacitor management circuit includes a plurality of capacitor modules, and where each capacitor module includes: a switch and a capacitor coupled in series between two terminals of the second port; and a control circuit configured to detect state information of the corresponding capacitor, and to control operation state of the switch, in order to realize independent control of each capacitor.

20 Claims, 9 Drawing Sheets

Power management circuit

POWER MANAGEMENT CIRCUIT, CAPACITOR MANAGEMENT CIRCUIT AND CAPACITOR MANAGEMENT METHOD THEREOF

RELATED APPLICATIONS

This application claims the benefit of Chinese Patent Application No. 201910753547.1, filed on Aug. 15, 2019, which is incorporated herein by reference in its entirety.

FIELD OF THE INVENTION

The present invention generally relates to the field of power electronics, and more particularly to power management circuits, and capacitor management circuits and methods.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Figure 1:
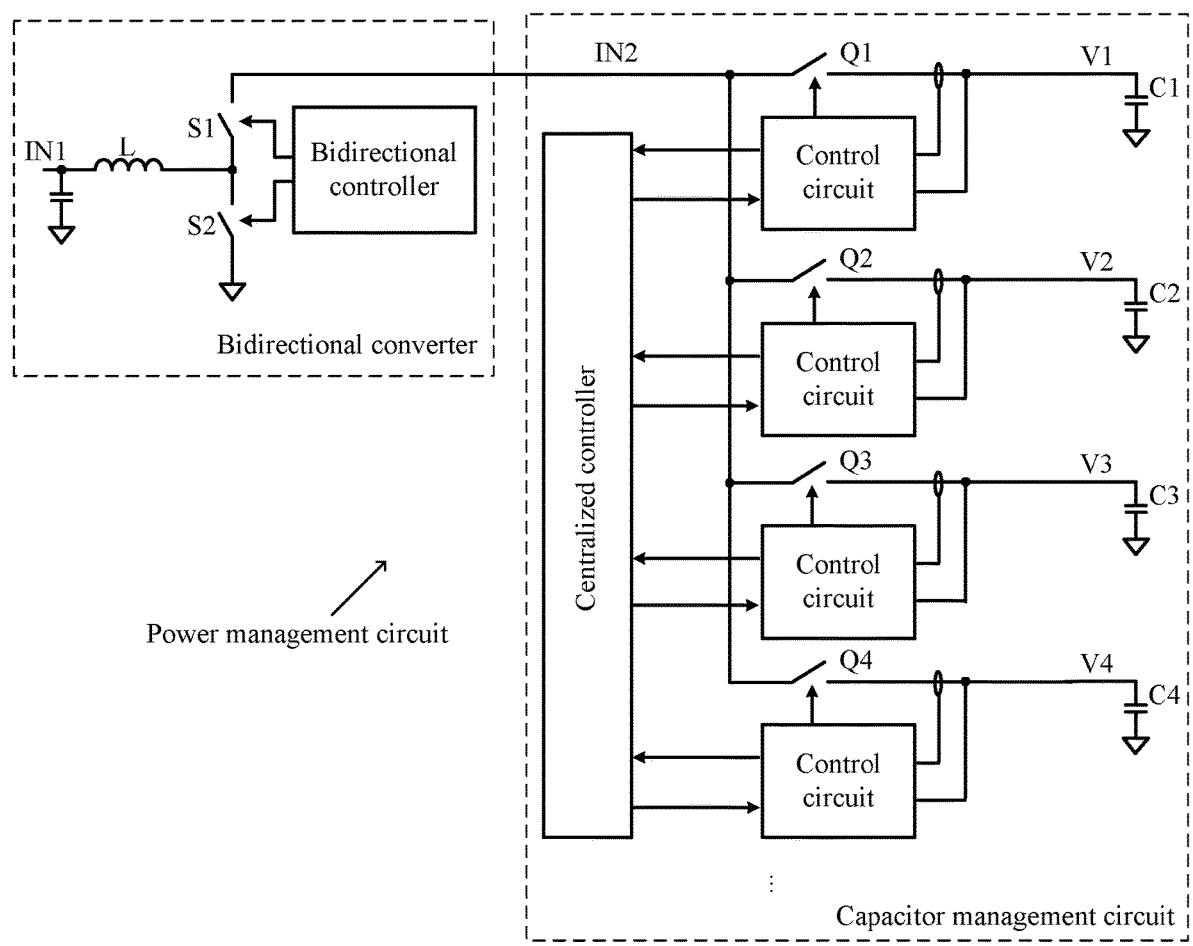
FIG. 1 is a schematic block diagram of an example power management circuit, in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

When a power management circuit is used as a backup power supply, multiple energy storage capacitors may typically be connected in parallel to the second port. In addition, a switch can be applied, such that the energy from a first port is stored in these energy storage capacitors through a bidirectional converter in the power management circuit during an energy storage mode, while the energy in the energy storage capacitor is released to the first port during a backup mode. However, if one energy storage capacitor fails, the rest of the energy storage capacitors may be in a passive discharge mode, and then the power management circuit may enter a protection state, which may substantially reduce the utilization of power in a steady state and increase the risk of system runaway. Moreover, it can be difficult and time-consuming to locate the fault capacitor. Also, if the system performs capacitance detection, the energy storage capacitors may discharge at the same time since the capacitors are connected in parallel. If the system sends a backup request at this time, since the energy storage capacitors are out of normal energy storage state, they may not be able to respond to the backup request in time, which can reduce the reliability of the system.

In one embodiment, a capacitor management circuit for a power management circuit, where the power management circuit includes a bidirectional converter having first and second ports, the capacitor management circuit includes a plurality of capacitor modules, and where each capacitor module can include: (i) a switch and a capacitor coupled in series between two terminals of the second port; and (ii) a control circuit configured to detect state information of the corresponding capacitor, and to control operation state of the switch, in order to realize independent control of each capacitor.

In one embodiment, a capacitor management method for a power management circuit having a bidirectional converter having first and second ports, can include: (i) detecting state information of a plurality of capacitors coupled in parallel between the second port of the bidirectional converter; and (ii) controlling operation states of a plurality of switches that are respectively coupled in series with the capacitors according to the state information, in order to independently control each capacitor.

Referring now to FIG. 1, shown is a schematic block diagram of an example power management circuit, in accordance with embodiments of the present invention. In this example, the power management circuit can include a bidirectional converter and its bidirectional controller, and a capacitor management circuit. Here, the bidirectional converter is, e.g., a buck/boost converter with ports IN1 and IN2. The power management circuit may have two basic operation modes: an energy storage mode and a backup mode. During the energy storage mode, the energy can be transferred from port IN1 to port IN2 through boost conversion, thereby charging the capacitor. In the backup mode, the capacitor may be discharged, and the energy can be transferred from port IN2 to port IN1 through buck conversion, in order to supply power to the external device coupled to port IN1. It should be understood that other converters with bidirectional power transmission function can also be applied in certain embodiments. The bidirectional controller can control the switching of the modes and switching states of the switches in the bidirectional converter under different modes to meet the load requirements.

The capacitor management circuit can include multiple capacitor modules/circuits connected in parallel between two terminals of port IN2. Each capacitor module can include a switch (e.g., Q1, Q2, Q3, Q4, etc.) and a capacitor (e.g., C1, C2, C3, C4, etc.) connected in series, and multiple control circuits that respectively correspond to the capacitor modules. Here, the number of the capacitor modules is 4 as an example. The control circuit can detect state information of the corresponding capacitor, and may control the switching states of the corresponding switch, thereby realizing independent control of the capacitors. The capacitor management circuit can also include a centralized controller for obtaining parameters in each control circuit and controlling the control circuits.

Figure 2:
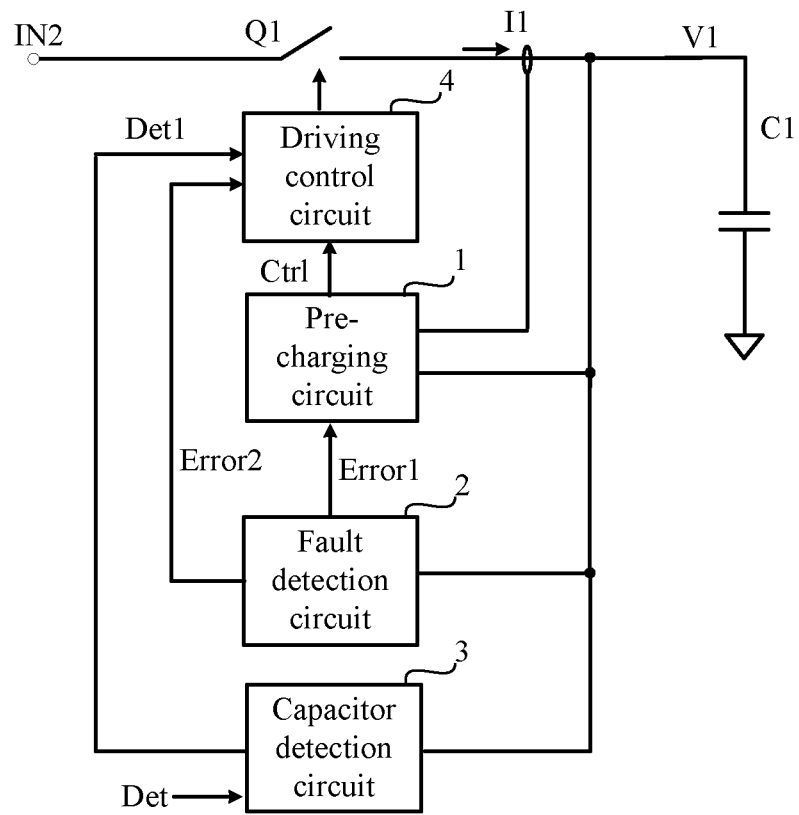
FIG. 2 is a schematic block diagram of a first example control circuit of the capacitor management circuit, in accordance with embodiments of the present invention.

Referring now to FIG. 2, shown is a schematic block diagram of a first example control circuit of the capacitor management circuit, in accordance with embodiments of the present invention. In this example, the control circuit that controls the first capacitor module is taken as an example. This control circuit can include pre-charging circuit 1, fault detection circuit 2, and driving control circuit 4. Here, pre-charging circuit 1 may receive voltage V1 across capacitor C1 and current Il flowing through capacitor C1, and can generate control signal Ctrl, such that driving control circuit 4 can control the switching states of switch Q1 according to control signal Ctrl. During the pre-charging stage, the bidirectional controller for the bidirectional converter can control the voltage on port IN2 to reach a first threshold. When voltage V1 is less than the first threshold, pre-charging circuit 1 can control switch Q1 to operate in a linear state by controlling the driving voltage of switch Q1, in order to maintain current Il at a reference current, and thereby avoiding current shock and damage to the capacitor. Here, the first threshold can be set, e.g., to 1.2 times the voltage at port IN1.

In some embodiments, the capacitors may simultaneously be pre-charged. When the pre-charging stage is completed (e.g., when all the voltages across the capacitors have reached the first threshold), pre-charging circuit 1 can control switch Q1 to be fully turned on. In addition, the pre-charging circuits corresponding to other capacitor modules can also control the corresponding switch to be fully turned on. Thus, the bidirectional controller can control the reference of the voltage at port IN2 to rated voltage Vout, and then the voltage at port IN1 may be boosted to charge the capacitors, such that voltage V1 across capacitor C1 also gradually rises to reach rated voltage Vout as the voltage at port IN2 rises, and enters a steady-state stage.

In certain embodiments, the capacitor management circuit can control the multiple capacitors to store energy one by one, and the control method may accordingly be different. Further, fault detection circuit 2 can determine whether a short circuit fault occurs in capacitor C1 by detecting voltage V1 across capacitor C. If an abnormality of voltage V1 is detected in the pre-charging stage, and if the abnormality still exists after the pre-charging time passes, fault signal Error1 can be generated to pre-charging circuit 1, such that control signal Ctrl is changed to control switch Q1 to be turned off. Here, the pre-charging time is the time during which capacitor C1 is in the pre-charging stage when it is normal. If the abnormality of voltage V1 is detected in the steady-state stage, fault signal Error2 may be generated to driving control circuit 4, such that driving control circuit 4 can control switch Q1 to be turned off to isolate fault capacitor C1. Since each capacitor in the capacitor management circuit is independently controlled, when one capacitor fails, the failed capacitor can be directly isolated and checked without affecting the operation of other capacitors, and thus ensuring the reliability of the system.

In some embodiments, the occurrence of a fault can be detected by detecting the voltage across the capacitor. Those skilled in the art will recognize that other approaches can also be applied to detect the fault, such as detecting the current flowing the capacitor and/or the temperature of the capacitor. In addition, the control circuit also can include capacitor detection circuit 3. When the system needs to conduct a health detection on the capacitor (e.g., obtaining capacitance C of the capacitor and equivalent series resistance ESR of the capacitor), capacitor detection circuit 3 may receive detection enable signal Det, and then capacitor detection circuit 3 can generate detection control signal Det1 to driving control circuit 4. This can control switch Q1 to be turned off, such that during the detection stage, the discharge of capacitor C1 may not affect the operation of other capacitors connected in parallel, and thereby ensuring that the system can reliably respond to the backup power demand.

Figure 3:
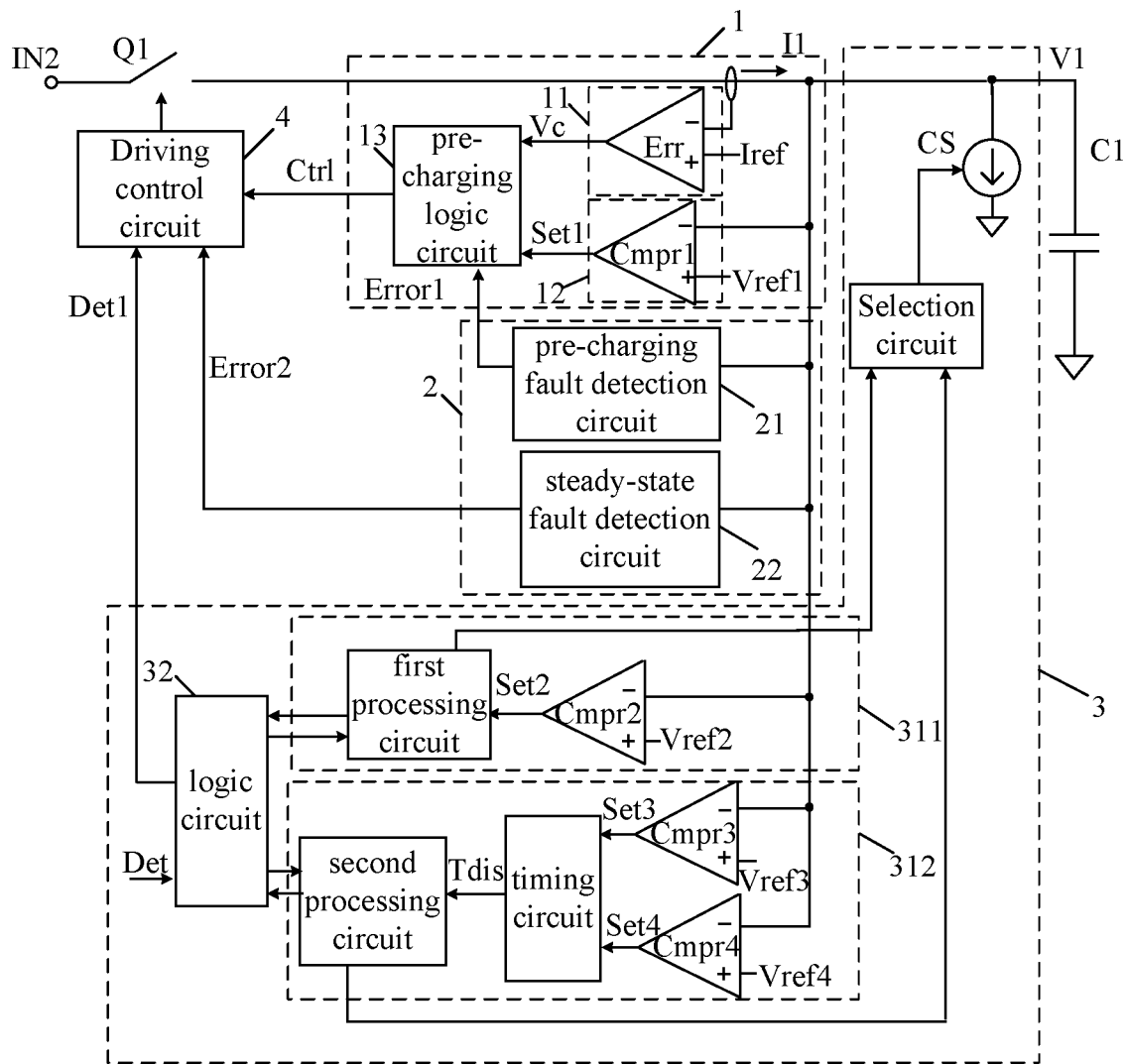
FIG. 3 is a schematic block diagram of a second example control circuit of the capacitor management circuit, in accordance with embodiments of the present invention.

Referring now to FIG. 3, shown is a schematic block diagram of a second example control circuit of the capacitor management circuit, in accordance with embodiments of the present invention. For example, pre-charging circuit 1 can include current control circuit 11, voltage control circuit 12, and pre-charging logic circuit 13. For example, current control circuit 11 can include error amplifier Err for comparing current Il against reference current Iref, and for generating compensation signal Vc to pre-charging logic circuit 13. Voltage control circuit 12 can include comparator Cmpr1 for comparing voltage V1 against threshold Vref1 to generate set signal Set1 to pre-charging logic circuit 13. When voltage V1 does not reach threshold Vref1, set signal Set1 can be active, and thus control signal Ctrl generated by pre-charging logic circuit 13 may be compensation signal Vc. Therefore, driving control circuit 4 can control the driving voltage of switch Q1 according to compensation signal Vc, in order to maintain current Il at reference current Iref.

When voltage V1 reaches threshold Vref1, set signal Set1 generated by comparator Cmpr1 may be inactive, and thus control signal Ctrl generated by pre-charging logic circuit 13 can be used to indicate the end of the pre-charging stage of capacitor C1. In some embodiments, after the pre-charging stages of all capacitors are completed, driving control circuit 4 can control switch Q1 to be fully turned on. In other embodiments, when the pre-charging stages of capacitor C1 ends, driving control circuit can control switch Q1 to be fully turned on. Thereafter, the voltage at port IN2 of the bidirectional converter can be controlled to be rated voltage Vout, such that voltage V1 across capacitor C1 may gradually rise to reach rated voltage Vout as the voltage at port IN2 rises.

In this particular example, fault detection circuit 2 can include pre-charging fault detection circuit 21 and steady-state fault detection circuit 22. For example, pre-charging fault detection circuit 21 can detect the abnormality of voltage V1 in the pre-charging stage. If the abnormality still exists after the pre-charging time, fault signal Error1 may be generated to pre-charging logic circuit 13, such that control signal Ctrl can be changed to control switch Q1 to be turned off. Also, steady-state fault detection circuit 22 can detect the abnormality of voltage V1 in the steady-state stage, and may generate fault signal Error2 to driving control circuit 4, such that driving control circuit 4 can control switch Q1 to be turned off to isolate fault capacitor C1.

Moreover, capacitor detection circuit 3 can include controlled current source CS, a discharge control circuit, and logic circuit 32. Further, the discharge control circuit can include discharge control circuits 311 and 312. Upon receiving the active detection enable signal Det, logic circuit 32 may generate detection control signal Det1 to driving control circuit 4 to control switch Q1 to be turned off. In addition, discharge control circuit 311 can begin to operate. For example, discharge control circuit 311 can include comparator Cmpr2 and a first processing circuit. The first processing circuit can control controlled current source CS to generate current Idis1 to discharge capacitor C1 through a selection circuit. When voltage V1 across capacitor C1 drops to threshold Vref2, output signal Set2 generated by comparator Cmpr2 may be active, and the first processing circuit may receive active output signal Set2 to control controlled current source CS to stop operating. In addition, the first processing circuit can calculate the ESR of the capacitor according to current Idis1 and threshold Vref2, where ESR=(Vout−Vref2)/Idis1.

In this example, discharge control circuit 312 can begin to operate when the first processing circuit receives output signal Set2 generated by comparator Cmpr2. Discharge control circuit 312 can include comparators Cmpr3 and Cmpr4, a second processing circuit, and a timing circuit. The second processing circuit can control controlled current source CS to generate current Idis2 to discharge capacitor C1 through the selection circuit. When voltage V1 across capacitor C1 drops to threshold Vref3, output signal Set3 generated by comparator Cmpr3 may be active, thereby controlling the timing circuit to start timing. When voltage V1 drops to threshold Vref4, output signal Set4 generated by comparator Cmpr4 can be active, thereby controlling the timing circuit to stop timing, such that discharge time Tdis of capacitor C1 may be generated. The second processing circuit can receive discharge time Tdis, and may control controlled current source CS to stop operating, and can simultaneously calculate capacitance C of the capacitor, where C=Idis2×Tdis/(Vref3−Vref4). At this point, the health detection of the capacitor may be completed, and detection control signal Det1 generated by logic circuit 32 can control switch Q1 to be turned on again, such that voltage V1 across capacitor C1 can return to rated voltage Vout. It should be understood that in this example, the ESR detection and the capacitance detection of the capacitor may be completed successively, or one of them can be detected separately.

Figure 4:
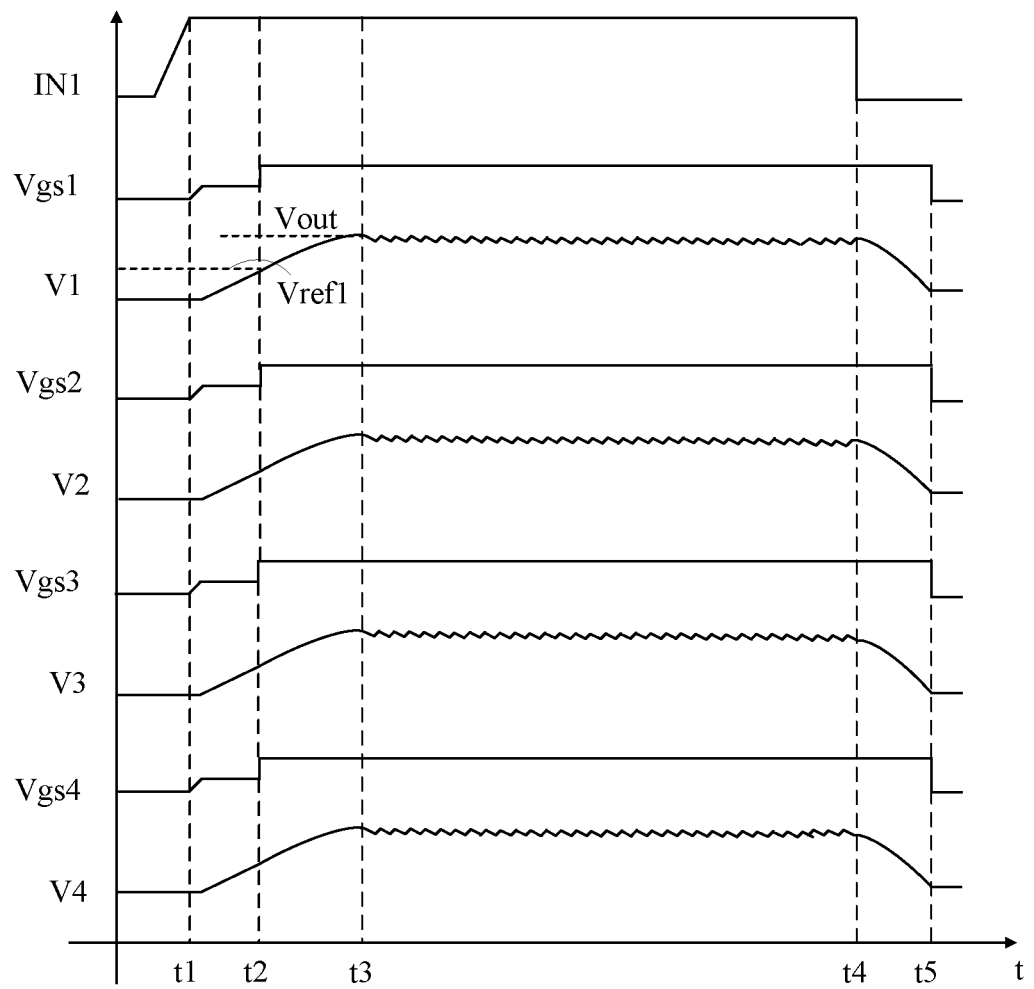
FIG. 4 is a waveform diagram of first example operation of the capacitor management circuit, in accordance with embodiments of the present invention.

Referring now to FIG. 4, shown is a waveform diagram of first example operation of the capacitor management circuit, in accordance with embodiments of the present invention. Here, the abscissa is time t, and the ordinate is the voltage at port IN1, driving voltages Vgs1-Vgs4, and voltages V1-V4 across capacitors C1-C4, respectively. In this example, multiple capacitors in the capacitor management circuit can store energy at the same time. At time t1, the voltage at port IN1 may be established. After that, the corresponding control circuit can respectively control driving voltages Vgs1-Vgs4 of switches Q1-Q4 according to the current flowing through each capacitor, thereby maintaining the current flowing through each capacitor at reference current Iref, in order to realize constant current energy storage, and thereby reducing the current shock.

At time t2, the voltages across each capacitor may linearly rise to threshold Vref1, and the pre-charging stage can end. During the pre-charging stage, the voltage at port IN2 may be controlled by the bidirectional controller to be kept at threshold Vref1. At time t3, the control circuits can control switches Q1-Q4 to be fully turned on, and the bidirectional controller of the bidirectional converter may be switched to control the voltage at port IN2 to rise to rated voltage Vout, such that the voltages across the capacitors may all gradually rise to rated voltage Vout as the rise of the voltage at port IN2, which can indicate that the energy storage is completed. At time t4, when the voltage at port IN1 does not exist, the capacitor management circuit may be in the backup mode, releasing energy to port IN1 in order to maintain the voltage at port IN1, so as to meet the load demand. In the backup mode, switches Q1-Q4 may all in a fully conductive state.

Figure 5:
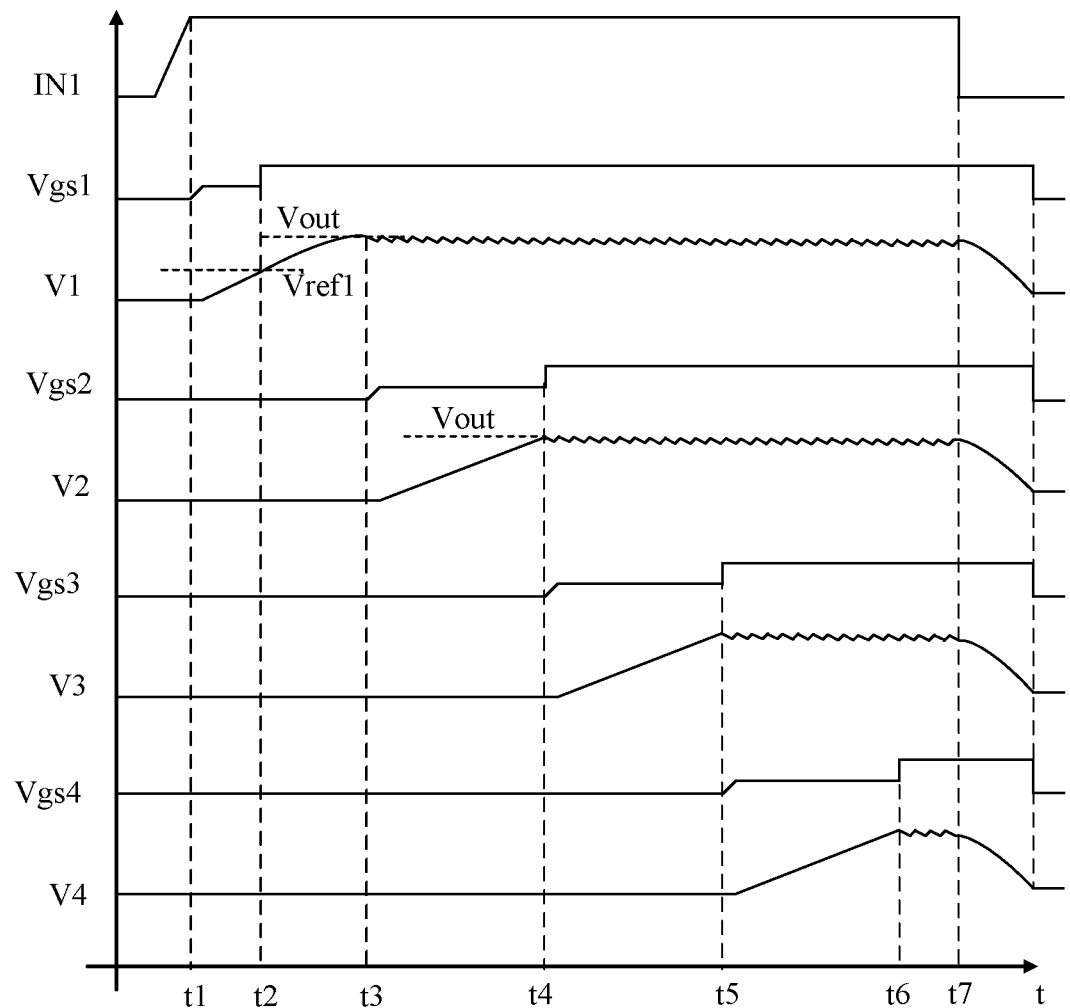
FIG. 5 is a waveform diagram of second example operation of the capacitor management circuit, in accordance with embodiments of the present invention.

Referring now to FIG. 5, shown is a waveform diagram of second example operation of the capacitor management circuit, in accordance with embodiments of the present invention. In this example, multiple capacitors in the capacitor management circuit can store energy one by one. At time t1, the voltage at port IN1 may be established. During time period t1-t2, the control circuit corresponding to switch Q1 can adjust driving voltage Vgs1 of switch Q1 to maintain the current flowing through capacitor C1 at reference current Iref. At time t2, voltage V1 across capacitor C1 may linearly rise to threshold Vref1. In this stage, the voltage at port IN2 can be controlled by the bidirectional controller of the bidirectional converter to be kept at threshold V1. After time t2, the control circuit can adjust driving voltage Vgs1 of switch Q1 to control switch Q1 to be completely turned on, and the bidirectional controller of the bidirectional converter may be switched to control the voltage at port IN2 to be rated voltage Vout, such that voltage V1 rises along with the voltage at port IN2 during time period t2-t3. At time t3, voltage V1 may reach rated voltage Vout. At this time, the centralized controller of the capacitor management circuit can detect that capacitor C1 has reached a steady state, and may generate an enable signal to the control circuit corresponding to capacitor C2 to start operating.

During time period t3-t4, the control circuit can directly control driving voltage Vgs2 of switch Q2 to maintain the current flowing through capacitor C2 at reference current Iref, and thus voltage V2 across capacitor C2 may linearly rise to rated voltage Vout. At time t4, voltage V2 may reach rated voltage Vout and then switch Q2, can completely be turned on. In addition, the centralized controller can detect that capacitor C2 has reached the steady state, and may generate an enable signal to control the control circuit corresponding to capacitor C3 to start operating. Similarly, during time period t4-t5, driving voltage Vgs3 of switch S3 can be adjusted to maintain current flowing through switch S3 at reference current Iref, and thus the voltage across capacitor C3 may also linearly rise to rated voltage Vout. After time t5, driving voltage Vgs3 can be adjusted to control switch S3 to be fully turned on. Switch S4 can be controlled in the same way. The voltage across capacitor C4 may also in turn linearly rise to rated voltage Vout at time t6, and then switch S4 can be controlled to be fully turned on. At time t7, when the voltage at port IN1 does not exist, the capacitor management circuit can enter the backup mode, thereby releasing energy to port IN1 in order to maintain the voltage at port IN1 to meet the load demand. In the backup mode, switches Q1-Q4 may all be in a fully conductive state.

Figure 6:
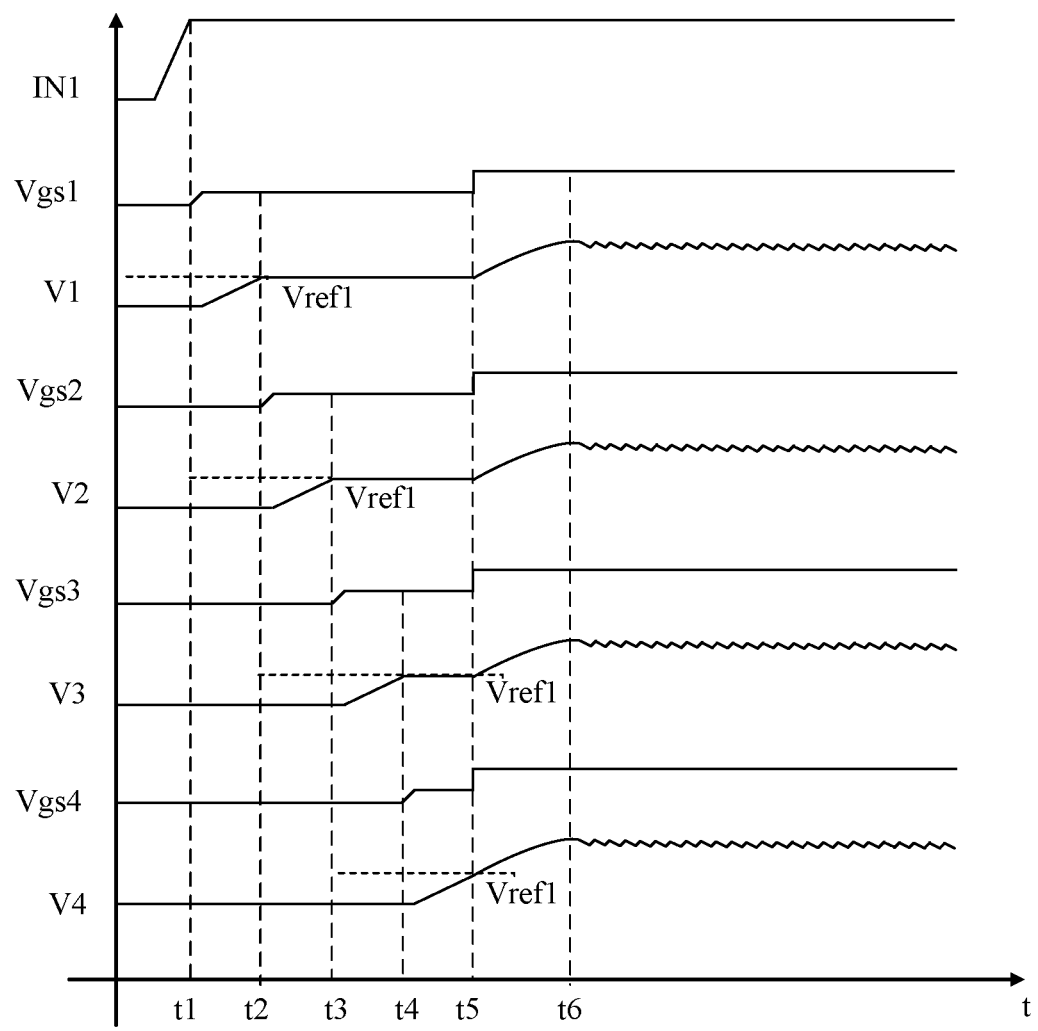
FIG. 6 is a waveform diagram of third example operation of the capacitor management circuit, in accordance with embodiments of the present invention.

Referring now to FIG. 6, shown is a waveform diagram of third example operation of the capacitor management circuit, in accordance with embodiments of the present invention. In this example, multiple capacitors in the capacitor management circuit can store energy one by one as an example. At time t1, the voltage at port IN1 may be established. During time period t1-t2, the control circuit corresponding to switch Q1 can adjust driving voltage Vgs1 of switch Q1 to maintain the current flowing through capacitor C1 at reference current Iref. At time t2, voltage V1 across capacitor C1 may linearly rise to threshold Vref1. After that, the control circuit can keep driving voltage Vgs1 of switch Q1 unchanged. In addition, the centralized controller in the capacitor management circuit can detect that capacitor C1 has reached a steady state, and then may generate an enable signal to control the control circuit corresponding to capacitor C2 to start operating.

During time period t2-t3, the control circuit can control driving voltage Vgs2 of switch Q2 to maintain the current flowing through capacitor C2 at reference current Iref. Then, voltage V2 across capacitor C2 can rise linearly, and may reach threshold Vref1 at time t3. After that, the control circuit can keep driving voltage Vgs2 of switch Q2 unchanged. In addition, the centralized controller in the capacitor management circuit can detect that capacitor C2 has reached a steady state, and then may generate an enable signal to control the control circuit corresponding to capacitor C3 to start operating. This process can continue, until the voltage across capacitor C4 reaches threshold Vref1 at time t5. During time period t1-t5, the bidirectional controller of the bidirectional converter can control the voltage at port IN2 to be threshold Vref1. After time t5, each control circuit can control the corresponding switch to be fully turned on. In addition, the bidirectional controller of the bidirectional converter can control the voltage at port IN2 to rise to rated voltage Vout, such that the voltages across the capacitors all gradually rise along with the voltage at port IN2 during time period t5-t6, thereby avoiding current shock.

Figure 7:
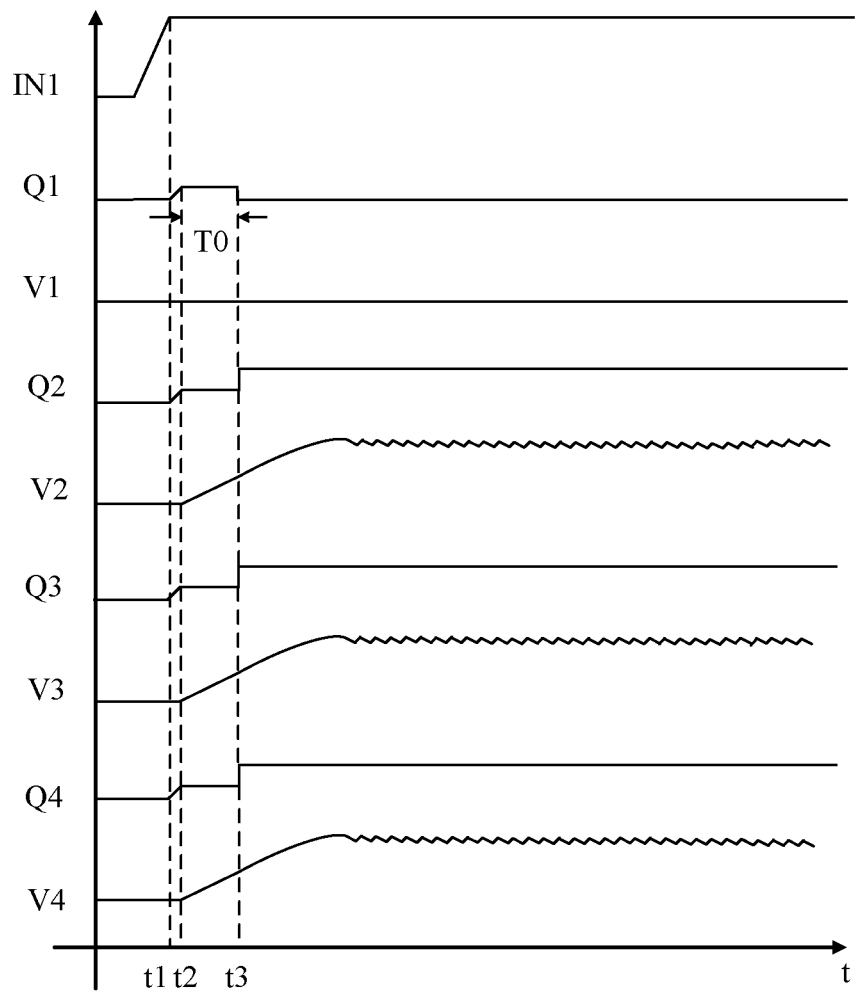
FIG. 7 is a waveform diagram of example operation when the capacitor management circuit fails, in accordance with embodiments of the present invention.

Referring now to FIG. 7, shown is a waveform diagram of example operation when the capacitor management circuit fails, in accordance with embodiments of the present invention. In this particular example, the multiple capacitors in the capacitor management circuit can store energy at the same time as an example. At time t1, the voltage at port IN1 may be established. Thereafter, the control circuits can start to adjust driving voltages Vgs1-4 of switches Q1-Q4, and the current flowing through each switch can be controlled and maintained at reference current Iref during time period t2-t3, such that the voltage across each capacitor rises linearly. Since the initial values of the voltages across each capacitor may all be zero in the pre-charging stage, when the fault detection circuit detects that the voltage across the capacitor is zero, it may not directly send out a fault signal, but can wait for pre-charging time T0 to elapse. If the capacitor is normal, its voltage can rise after pre-charging time T0. If a certain capacitor fails, the voltage across that capacitor may remain zero. At time t3, the pre-charging stage can end, the voltage across capacitor C1 may have not risen yet, and the corresponding control circuit can control switch Q1 to be turned off, such that fault capacitor C1 can be isolated, and other capacitors can operate normally without being affected by the fault capacitor.

Figure 8:
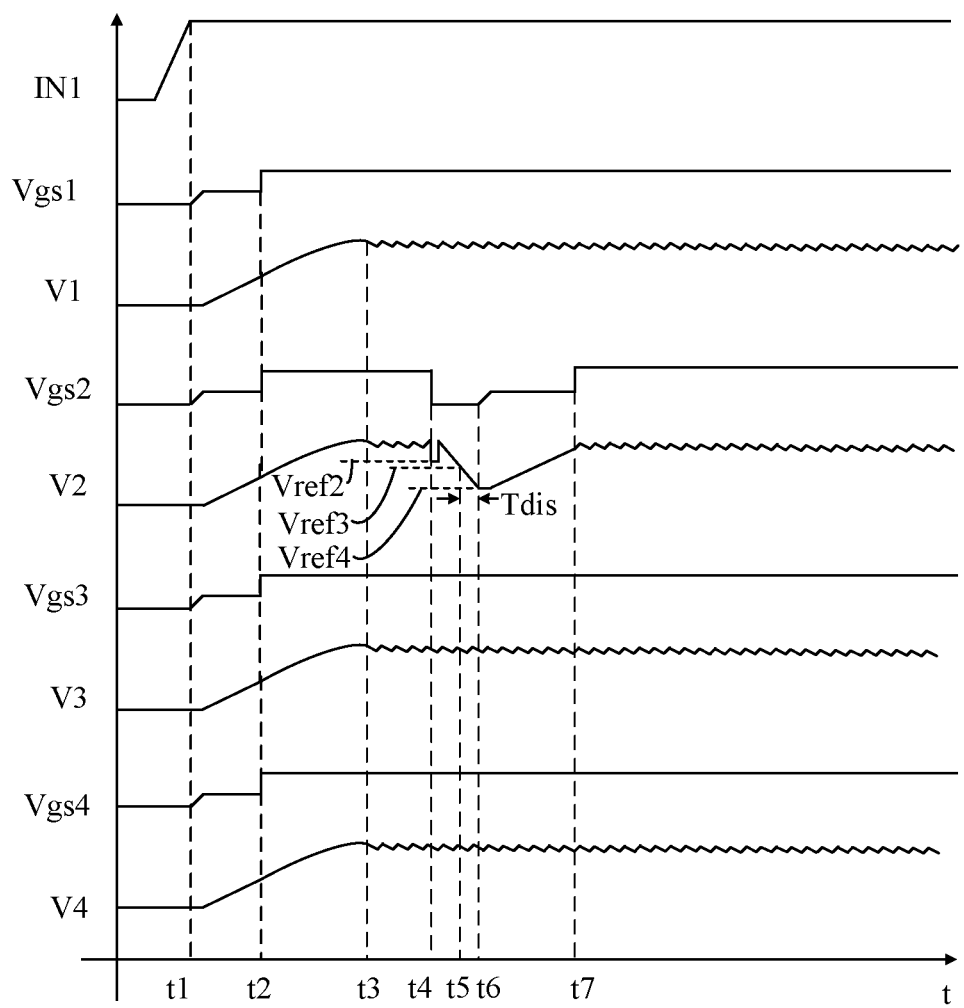
FIG. 8 is a waveform diagram of example operation when the capacitor management circuit performs capacitor health detection, in accordance with embodiments of the present invention.

Referring now to FIG. 8, shown is a waveform diagram of example operation when the capacitor management circuit performs capacitor health detection, in accordance with embodiments of the present invention. In this particular example, the multiple capacitors in the capacitor management circuit store energy at the same time as an example. After time t3, the voltage of each capacitor may reach rated voltage Vout, and can enter the steady-state stage. At time t4, the system may send out detection enable signal Det to detect ESR and capacitance of capacitor C2. In addition, switch Q2 can be controlled to be turned off, while other capacitors remain in the steady state.

At time t4, capacitor C2 can be controlled to discharge instantaneously with current Idis1 until its voltage reaches threshold Vref2, and then the first processing circuit can calculate the ESR of capacitor C2. Thereafter, capacitor C2 may be controlled to discharge with current Idis2 until time t5, and the voltage across capacitor C2 can drop to threshold Vref3, such that the timing circuit starts timing. At time t6, when the voltage across capacitor C2 drops to threshold Vref4, the timing can be stopped and capacitor C2 may be controlled to stop discharging. Therefore, the second processing circuit can obtain the capacitance of capacitor C2 according to current Idis2, threshold Vref3, threshold Vref4, and timing time Tdis. For example, current Idis2 can be less than current Idis1, so the capacitance detection time is longer than the ESR detection time. After the detection has completed, the voltage across capacitor C2 may have dropped substantially as compared with that in the steady state. Therefore, after time t6, the control circuit can control driving voltage Vgs2 of switch Q2 to keep the current flowing through switch Q2 at reference current Iref, such that the voltage across capacitor C2 linearly rises to the rated voltage and returns to the steady state again.

Figure 9:
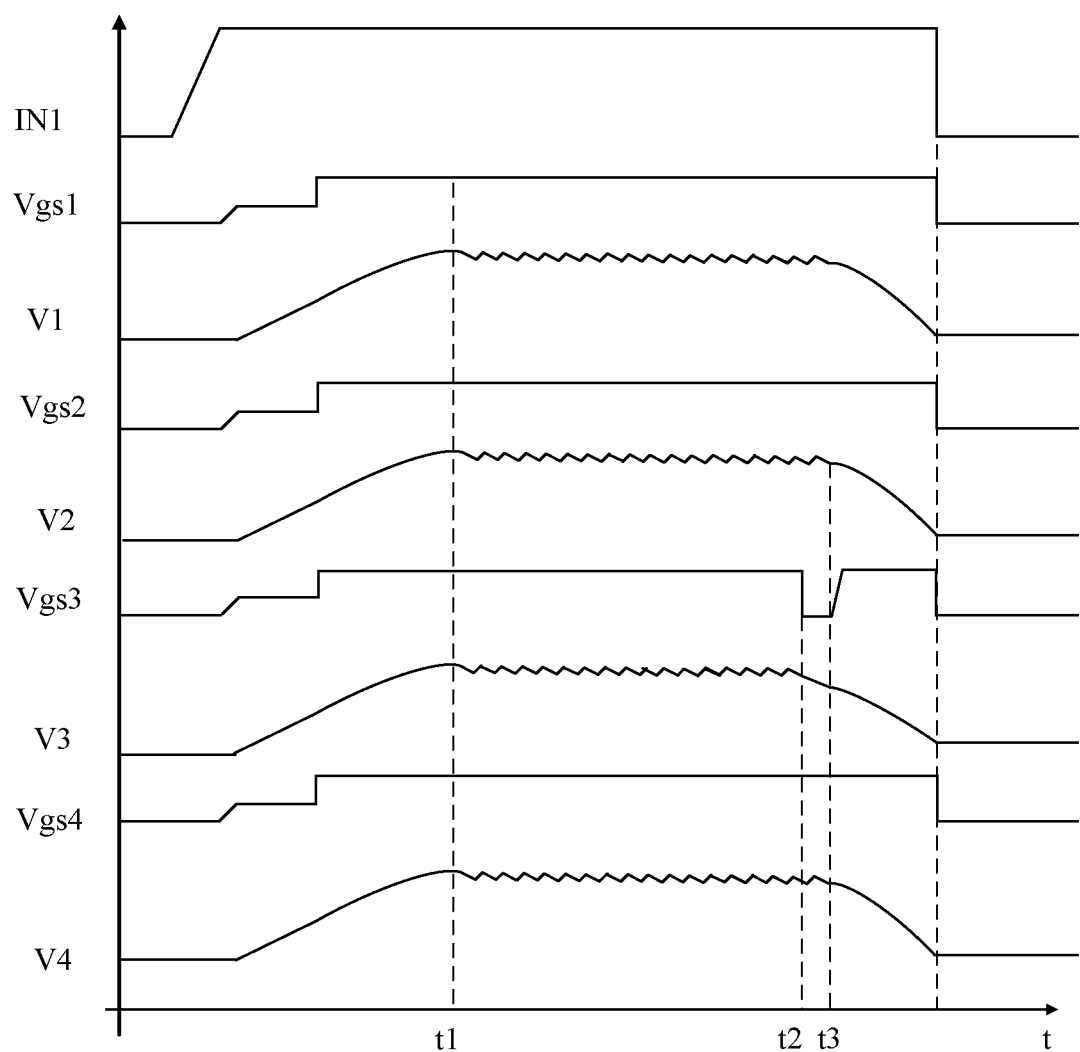
FIG. 9 is a waveform diagram of example operation when the capacitor management circuit enters a backup mode, in accordance with embodiments of the present invention.

Referring now to FIG. 9, shown is a waveform diagram of example operation when the capacitor management circuit enters a backup mode, in accordance with embodiments of the present invention. After time t1, the voltage across each capacitor may have reached a steady state. At time t2, the capacitor detection circuit can detect the capacitance of capacitor C3, and voltage V3 may drop. At time t3, the capacitance detection circuit may have not completed the detection, but the system can detect that the voltage at port IN1 is powered off and should immediately enter the backup mode. At this time, the capacitor detection circuit can immediately stop the discharge of the capacitor, and the centralized controller may detect the voltage difference between capacitor C3 and other capacitors.

During time period t2-t3, the voltage difference may be greater than a predetermined value, then the centralized control sends a corresponding signal to the control circuit corresponding to capacitor C3, in order to keep switch Q3 in the turn-off state, thereby preventing the current shock caused by the excessive voltage difference from consuming the capacitor. At time t4, the voltage difference is less than the predetermined value, then the centralized controller may send a corresponding signal to the control circuit corresponding to capacitor C3 to control switch Q3 to be fully turned on, such that capacitor C3 can discharge to port IN1 together with other capacitors.

As described above, multiple capacitors can be coupled in parallel to the second port (e.g., IN2) of a bidirectional converter in a power management circuit, and each capacitor can be coupled in series with a switch. Thus, the capacitor management circuit in particular embodiments can achieve independent control of each capacitor without affecting the operation of other capacitors by controlling the switches.

The embodiments were chosen and described in order to best explain the principles of the invention and its practical applications, to thereby enable others skilled in the art to best utilize the invention and various embodiments with modifications as are suited to particular use(s) contemplated.

It is intended that the scope of the invention be defined by the claims appended hereto and their equivalents.

What is claimed is:

1. A capacitor management circuit for a power management circuit, wherein the power management circuit comprises a bidirectional converter having first and second ports, the capacitor management circuit comprising a plurality of capacitor modules, and wherein each capacitor module comprises:
   a) a switch and a capacitor coupled in series between two terminals of the second port;
   b) a control circuit configured to detect state information of the corresponding capacitor, and to control operation state of the switch, in order to realize independent control of each capacitor; and
   c) wherein the control circuit comprises a pre-charging circuit configured to generate a control signal according to a voltage across the capacitor and a current flowing through the capacitor in a pre-charging stage, in order to control the operation state of the switch.

2. The capacitor management circuit of claim 1, wherein the control circuit comprises a fault detection circuit configured to detect an occurrence of a fault according to the state information of the capacitor, and to generate a fault signal to control the operation state of the switch.

3. The capacitor management circuit of claim 2, wherein:
   a) the switch is controlled to operate in a linear state during a pre-charging stage under an energy storage mode, and to be fully turned on after the pre-charging stage ends; and
   b) the voltage across the capacitor rises gradually to a voltage at the second port during the pre-charging stage.

4. The capacitor management circuit of claim 2, wherein the pre-charging circuit comprises:
   a) a voltage control circuit configured to determine whether the pre-charging stage ends according to the voltage across the capacitor; and
   b) a current control circuit configured to generate a compensation signal in the pre-charging stage as the control signal, in accordance with an error between the current flowing through the capacitor and a reference current, in order to maintain the current flowing through the capacitor as constant.

5. The capacitor management circuit of claim 2, wherein the fault detection circuit is configured to generate a first fault signal to control the switch to be turned off after a pre-charging time passes, and when a fault of the capacitor occurs in the pre-charging stage during the energy storage mode.

6. The capacitor management circuit of claim 2, wherein the fault detection circuit is configured to generate a second fault signal to control the switch to be turned off when a fault of the capacitor occurs in a steady-state stage during the energy storage mode.

7. The capacitor management circuit of claim 2, wherein:
   a) each control circuit further comprises a capacitor detection circuit configured to conduct a health detection of the capacitor; and
   b) the corresponding switch is controlled to be turned off during the health detection.

8. The capacitor management circuit of claim 7, wherein the capacitor detection circuit comprises:
   a) a controlled current source configured to provide a discharging current for the capacitor;
   b) a discharge control circuit configured to obtain a capacitance and/or an equivalent series resistance of the capacitor according to the voltage across the capacitor and the discharging current; and
   c) a logic circuit configured to control the switch to be turned off when the capacitor is to be detected, and to control the discharge control circuit to start operating.

9. The capacitor management circuit of claim 7, wherein the capacitor detection circuit is further configured to control the detected capacitor to stop discharging when a voltage at the first port is powered off during the health detection.

10. The capacitor management circuit of claim 9, wherein when a difference between the voltage across the capacitor and the voltages across other capacitors is less than a predetermined value, the switch connected to the detected capacitor is turned on.

11. A power management circuit, comprising the bidirectional converter and the capacitor management circuit of claim 1, and further comprising a bidirectional controller configured to control switching states of switches in the bidirectional converter, in order to achieve bidirectional power transmission between the first and second ports.

12. The power management circuit of claim 11, wherein the voltage at the second port is controlled to be a first threshold during a pre-charging stage of each capacitor, and to rise to a rated voltage when the pre-charging stage ends, when the plurality of capacitors are controlled to store energy at the same time.

13. The power management circuit of claim 11, wherein the voltage at the second port is controlled to be a first threshold during a pre-charging stage of a first capacitor, and to rise to a rated voltage when the pre-charging stage of the first capacitor ends, when the plurality of capacitors are controlled to store energy one by one.

14. The power management circuit of claim 11, wherein the voltage at the second port is controlled to be a first threshold during each pre-charging stage of the capacitors, and to rise to a rated voltage after the pre-charging stage of the last capacitor ends, when the plurality of capacitors are controlled to store energy one by one.

15. A capacitor management method for a power management circuit comprising a bidirectional converter having first and second ports, the method comprising:
   a) detecting state information of a plurality of capacitors coupled in parallel between the second port of the bidirectional converter;
   b) controlling operation states of a plurality of switches that are respectively coupled in series with the capacitors according to the state information, in order to independently control each capacitor;
   c) controlling an order of energy storage of the plurality of capacitors by controlling the operation states of the switches; and
   d) controlling the capacitor to store energy according to a voltage across the capacitor and a current flowing through the capacitor.

16. The method of claim 15, further comprising:
   a) controlling the switch to operate in a linear state in a pre-charging stage; and
   b) controlling the switch to be fully turned on after the pre-charging stage ends, wherein the voltage across the capacitor rises gradually to a voltage at the second port during the pre-charging stage.

17. The method of claim 16, wherein the controlling the switch to operate in a linear state comprises controlling a driving voltage of the switch to maintain the current flowing through the capacitor to be constant, such that the voltage across the capacitor rises gradually.

18. The method of claim 15, further comprising controlling the switch corresponding to a fault capacitor to be turned off after a pre-charging time, when the fault occurs in the pre-charging stage.

19. The method of claim 15, further comprising controlling the switch corresponding to a fault capacitor to be turned off immediately, when the fault occurs in the steady stage.

20. A capacitor management method for a power management circuit comprising a bidirectional converter having first and second ports, the method comprising:
  a) detecting state information of a plurality of capacitors coupled in parallel between the second port of the bidirectional converter;
  b) controlling operation states of a plurality of switches that are respectively coupled in series with the capacitors according to the state information, in order to independently control each capacitor; and
  c) controlling the switch corresponding to a fault capacitor to be turned off immediately, when the fault occurs in the steady stage.

* * * * *